United States Patent [19]

Hemme et al.

[11] Patent Number: 6,039,076

[45] Date of Patent: Mar. 21, 2000

[54] HIGH ENERGY LOSS FLUID CONTROL DEVICE

[75] Inventors: Kent R. Hemme; Allan K. Shea, both of Erie, Pa.

[73] Assignee: Copes-Vulcan, Inc., Lake City, Pa.

[21] Appl. No.: 09/109,122

[22] Filed: Jun. 30, 1998

[51] Int. Cl.⁷ ............................................... F16K 47/08
[52] U.S. Cl. .................... 137/625.37; 137/625.3
[58] Field of Search .................. 137/625.3, 625.37

[56] References Cited

U.S. PATENT DOCUMENTS

| Re. 32,197 | 7/1986 | Self | 251/127 |
|---|---|---|---|
| 3,514,074 | 5/1970 | Self | 251/127 |
| 3,954,124 | 5/1976 | Self | 137/625.3 X |
| 4,011,287 | 3/1977 | Marley | 261/64 |
| 4,068,683 | 1/1978 | Self | 137/625 |
| 4,105,048 | 8/1978 | Self | 138/42 |
| 4,127,146 | 11/1978 | Self | 137/625 |
| 4,267,045 | 5/1981 | Hoof | 210/322 |
| 4,279,274 | 7/1981 | Seger | 138/42 |
| 4,335,744 | 6/1982 | Bey | 137/522 |
| 4,617,963 | 10/1986 | Stares | 137/625.3 |
| 4,938,450 | 7/1990 | Tripp et al. | 251/30.03 |
| 5,390,896 | 2/1995 | Smirl | 251/127 |

*Primary Examiner*—John Fox
*Attorney, Agent, or Firm*—Pearne, Gordon, McCoy & Granger LLP

[57] ABSTRACT

A high energy loss fluid control device includes a plurality of annularly-shaped discs stacked one upon another and a reciprocal plug in slidable contact with the discs. Each of the discs has an inner periphery, an outer periphery, and a plurality of flow passageways extending between an inlet and an outlet located at the inner and outer peripheries. Each of the flow passageways have a plurality of sections connected with right-angle turns. The sections alternate between extending in a circumferential direction and a radial direction. Each passageway has an expanding cross-sectional area but each section has a constant cross-sectional area. A first one of the sections is radially extending toward the inlet to cause fluid to act upon itself and expend energy by turbulent interaction. Immediately downstream of the first section, second one of the sections is radially extending toward the outlet. The second section is generally straight and of a length adequate to regain control of fluid velocity for true frictional losses. Additionally, a passages connects adjacent passageways at the downstream end of the second passage so that fluid in adjacent passageways interacts, further resolves turbulence, equalizes stage pressure, and flows around any plugging by debris. Each passageway makes use of multiple inlets and outlets.

20 Claims, 3 Drawing Sheets

HIGH ENERGY LOSS FLUID CONTROL DEVICE

BACKGROUND OF THE INVENTION

The present invention generally relates to devices which control the velocity of high-pressure fluids and, more particularly, to such devices which include a stack of labyrinth discs.

Valves or other throttling devices, that is devices having an orifice with a high velocity short throat section, are typically utilized in controlling the flow of high-pressure fluids. These devices, however, are typically subject to severe cavitation, noise, vibration, and erosion problems. Fluid in a liquid state may vaporize as it passes through the throat section of the orifice and then recondense downstream with implosive action which induces high energy shock waves. The shock waves can severely damage and/or erode sections of the valve or pipe. Compressible fluids, or fluids in a gaseous state, have extremely high velocities when subjected to high pressure drops across a short throat section. Such high velocities cause fluid turbulent interaction which results in unacceptable levels of noise and vibration.

It is well established that limiting kinetic energy exiting the throttling area, reduces problems of noise, vibration, erosion, and shortened product life. Therefore, many fluid control devices include restrictors which dissipate energy in conjunction with fluid throttling. The most common restrictors subdivide the flow into a plurality of small, long, and tortuous serpentine or labyrinth passageways with abrupt turns. Energy is dissipated through either frictional resistance, multiple changes of direction created by either baffles or obstructions, or a combination of both. By providing such energy dissipation methods to sufficiently reduce the pressure, while expanding the area of the passageway, the velocity of the fluid is controlled to within acceptable limits.

In fluid control valves, the tortuous passageways are usually incorporated in valve trim. Typically, a valve plug is surrounded with a stack of annularly-shaped discs, forming a cylinder. These fluid control valves, however, can still have relatively high levels of noise, vibration, and erosion. This is believed to be due to the fact that the devices do not behave as theoretically predicted. There is actually very little frictional loss because the fluid tends to take the path of least resistance. That is, the fluid tends to hug the ends of projections, creating dead zones in the corners, resulting in a much less tortuous path than one would imagine by simply looking at the disc passageways. Additionally, the pressure profile from the inlet to the outlet is often nonlinear and unpredictable. Accordingly, there is a need in the art for an improved high-energy loss fluid control device which increases product life, has a relatively linear and predictable pressure profile, and reduces noise, vibration, and erosion.

BRIEF SUMMARY OF THE INVENTION

The present invention provides a high-energy loss fluid control device which overcomes at least some of the above noted problems of the related art. According to the present invention, a disc stack for the fluid control device includes a plurality of annularly-shaped discs stacked one upon another. Each of the annularly-shaped discs has an inner periphery, an outer periphery, and a plurality of passageways extending between an inlet and an outlet located at the inner and outer peripheries. Each of the passageways have a plurality of sections connected with right-angle turns. The sections alternate between extending in a circumferential direction and extending in a radial direction. A first one of the sections is radially extending back toward the inlet to cause fluid to act upon itself and expend energy by turbulent interaction. A second one of the sections, located downstream of the first one of the sections, is generally straight and of a length adequate to regain control of fluid velocity to resolve the turbulence created in the first section so that true frictional losses can be obtained. Additionally, adjacent passageways in the disc are preferably free to interact at the end of the second one of the sections so that the turbulence created in the first one of the passageways can continue to be resolved and stage pressures can equalize. It is noted that prior art discs having completely separate flow passageways, lose capacity when debris finds it way into and plugs one of the passageways. The interaction at the end of the second section permits fluid to flow around any debris that may find its way into and plug the passageway so that capacity and function are not lost.

Preferably, each section has a constant cross-sectional area for increased true frictional losses, but the cross-sectional area of separate sections are increasing in size to obtain desired fluid velocities. Sufficient sections are included to reduce pressure while controlling fluid velocity. Additionally, numerous sections are preferably of a length adequate to obtain true frictional losses.

BRIEF DESCRIPTION OF THE SEVERAL VIEWS OF THE DRAWING

These and further features of the present invention will be apparent with reference to the following description and drawings, wherein.

DETAILED DESCRIPTION OF PREFERRED EMBODIMENTS

Figure 1:
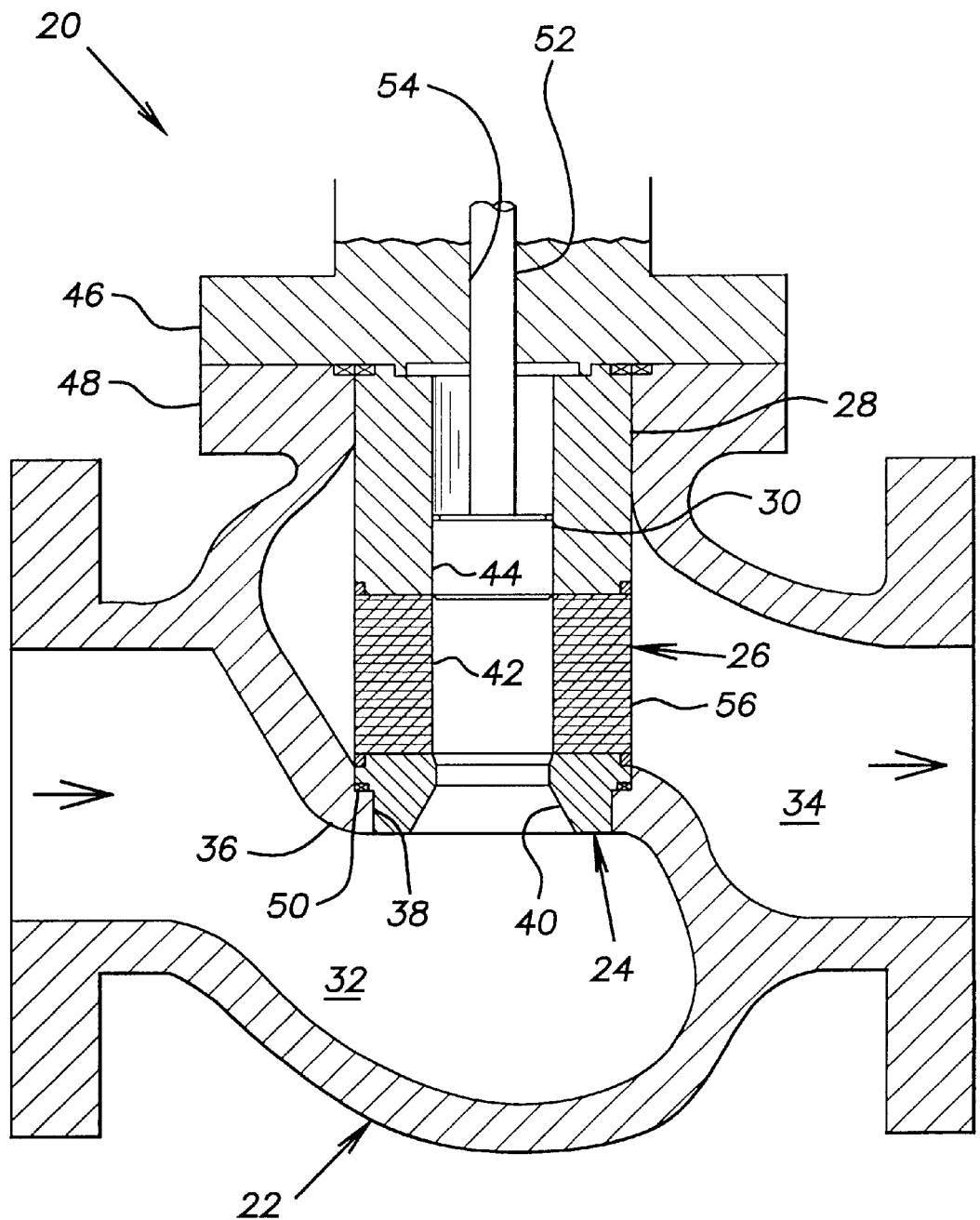
FIG. 1 is an elevational view, in partial cross section, of a high-pressure fluid control valve having a stack of energy dissipating trim discs according to the present invention.
Figure 2:
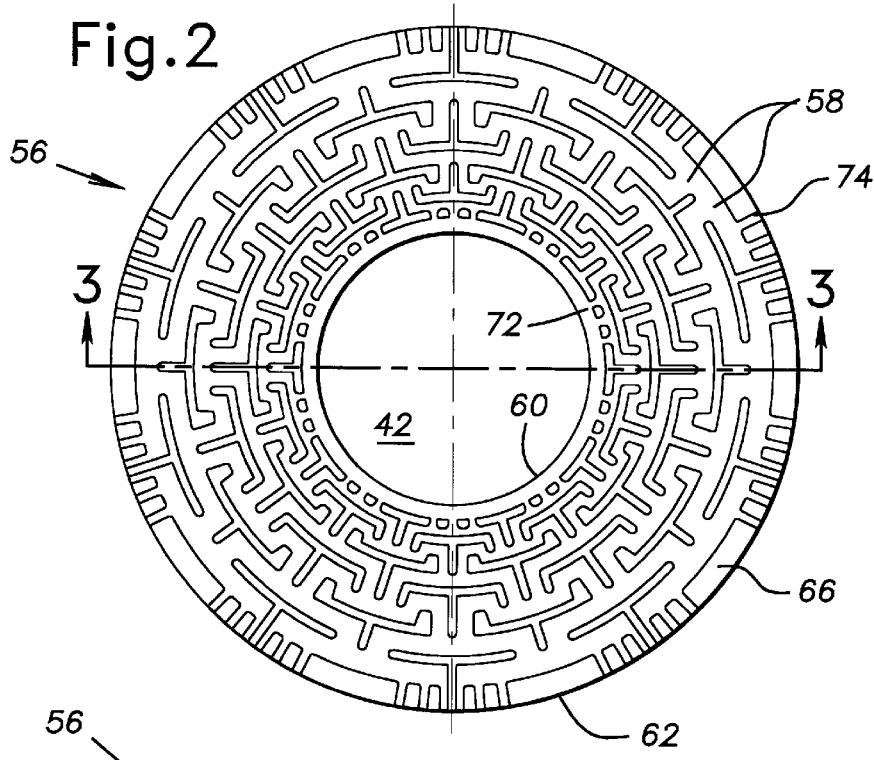
FIG. 2 is an enlarged plan view of one of the discs of FIG. 1 showing a plurality of multi-turn flow passageways formed therein.
Figure 3:
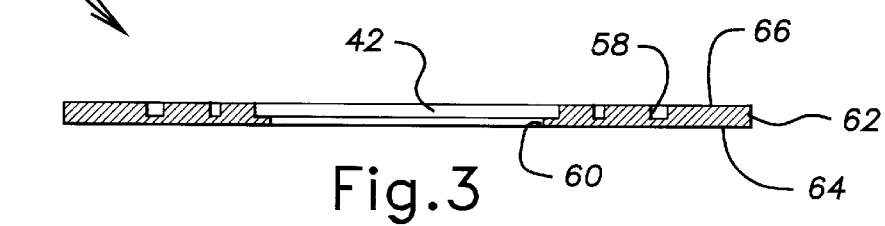
FIG. 3 is a cross-sectional view taken along line 3—3 of FIG. 2.
Figure 4:
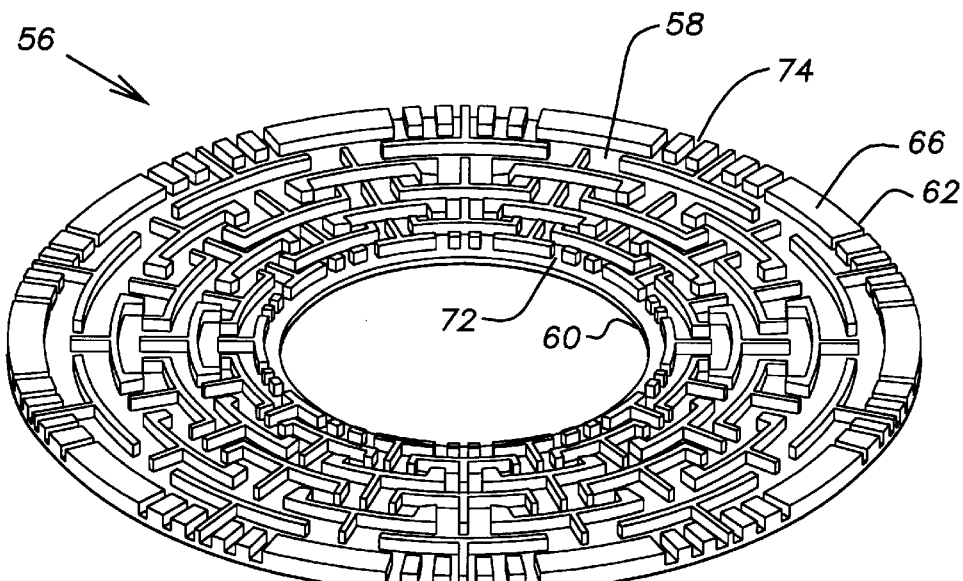
FIG. 4 is an enlarged perspective view of the disc of FIG. 2.

FIG. 1 illustrates a high-pressure fluid control valve 20 according to the present invention. The fluid control valve 20 includes a valve body 22, a seat ring 24, a cylinder of stacked discs or cage 26, a balancing cylinder 28, and a valve plug 30. The typical valve body 22 forms an inlet or first chamber 32 and an outlet or second chamber 34 which are separated by a generally horizontally extending web 36. The web 36 has a vertically extending bore or opening 38 formed therein. It is noted that flow can alternately be in the other direction in which the second chamber 34 is the inlet and the first chamber 32 is the outlet.

The seat ring 24 is annularly-shaped having a central fluid passage 40 with a bevelled upper end which forms a valve seat. The seat ring 24 also has a downward facing shoulder or abutment about its outer periphery which supports the seat ring 24 on an upward facing abutment or shoulder of the web opening 38. A suitable annularly-shaped sealing member 50 is provided between the seat ring 24 and the web 36 to form a seal therebetween.

The cylinder of stacked discs 26, described in more detail hereinafter, is positioned above the seat ring 24. The balancing cylinder 28 is positioned above the stacked discs 26. The stacked discs 26 and the balancing cylinder 28 are provided with aligned cylindrical bores 42, 44. The bores 42, 44 are also aligned with the central fluid passage 40 of the seat ring 24.

A valve bonnet 46 is bolted or otherwise secured to a flange 48 at the upper side of the valve body 22. The valve bonnet 46 engages and secures together the entire assembly of the seat ring 24, the stacked discs 26, and the balancing cylinder 28.

The valve plug 30 is closely and slidably received in the bores 42, 44 of the stacked discs 26 and the balancing cylinder 28. The valve plug 30 is connected to an operating rod or stem 52 which projects through a bore 54 in the valve bonnet 46 and is connected to a suitable actuating mechanism for reciprocally moving the valve plug 30. The actuating mechanism can be either automatic or manual. The valve plug 30 has a tapered surface at its lower end which seats against the valve seat of the seat ring 24 when the valve plug 30 is in its lower most position.

When the valve plug 30 is located away from the seat ring 24, the valve 20 is open and the fluid passage 40 of the seat ring 24 communicates the inlet chamber 32 with the outlet chamber 34. The valve 24 is closed by actuating the valve plug 30 to its lower most position against the seat ring 24 to close the fluid passage 40 communicating the inlet chamber 32 with the outlet chamber 34.

The cylinder of stacked discs 26 includes a plurality of annually-shaped discs 56 stacked one atop of another and fastened together by any suitable means such as for, example, brazing, welding, or bolting. Each of the individual discs 56 has a plurality of flow passageways 58 (FIGS. 2–5) formed therein so that high-pressure fluid flows radially through the stacked discs 26 from an inside edge 60 forming the bore 42 to an outside edge 62. It should be noted, however, that the discs 56 can be alternatively arranged for flow from the outside edge to the inside edge.

As shown in FIGS. 2–5, the bottom surface 64 of each disc 56 is generally flat and smooth while the top surface 66 of each disc has the flow passageways 58 formed therein. The flow passageways 58 can be formed by any suitable means such as, for example, etching, machining, or burning (EDM). The discs 56 are stacked one on top another (as shown in FIG. 1), so that the bottom surface 64 of one disc 56 is placed on the top surface 66 of the adjoining disc 56 thereby sealing the flow passageways 58 of each disc 56 with the flat bottom surface 64 of the adjoining disc 56. The very top disc 56 can be sealed with a flat cover sheet.

Each disc 56 has a plurality of sectors each having one of the flow passageways 58 therein. The illustrated disc 56 has twenty sectors and therefore twenty flow passageways 58. It is noted, however, that there can be a greater or lesser number of flow passageways 58.

Figure 5:
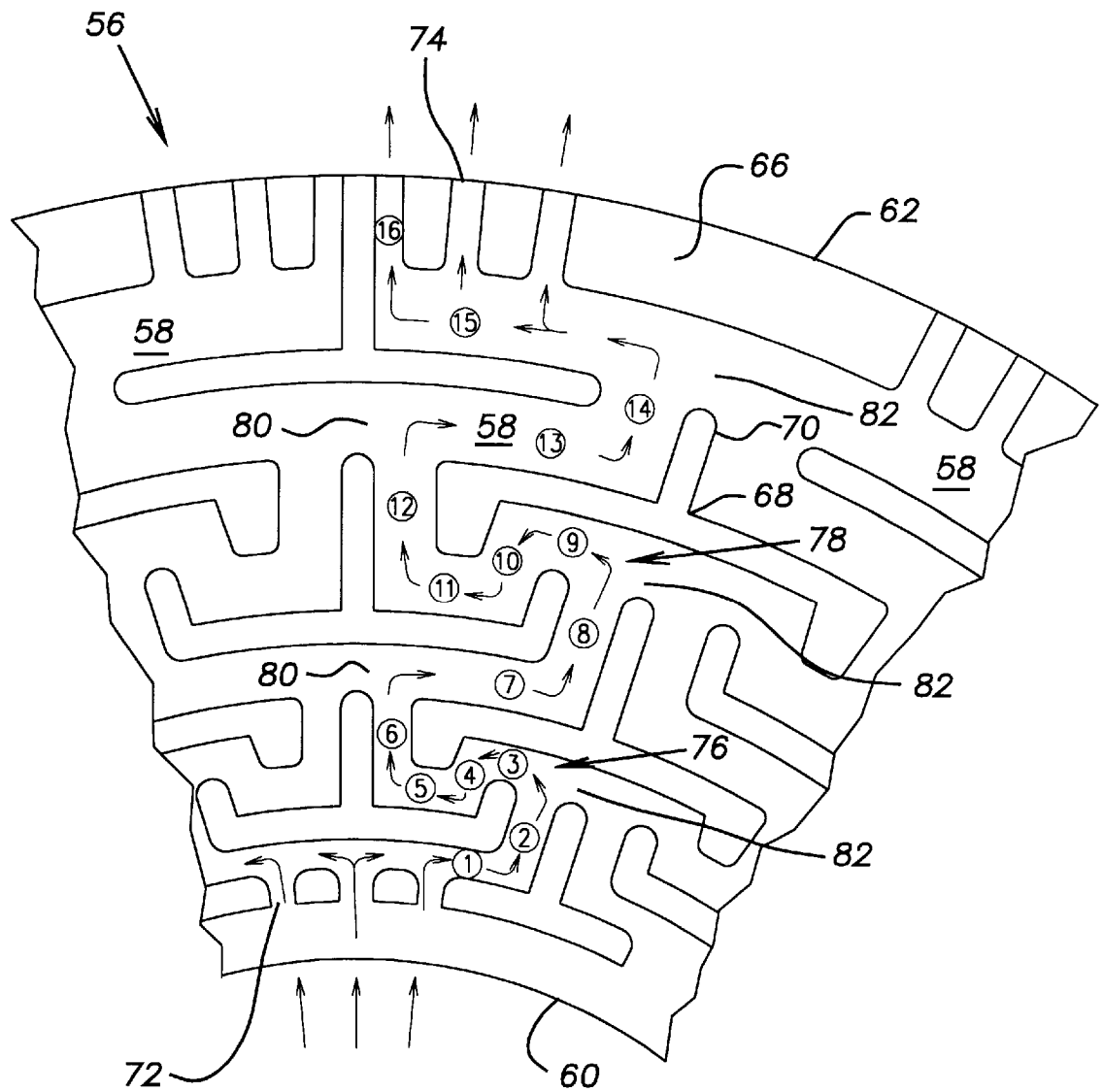
FIG. 5 is an enlarged fragmented view of a portion of the disc of FIG. 2 in the area of one of the multiturn flow passageways.

As best seen in FIG. 5, each flow passageway 58 is a multi-turn labyrinth having a plurality of stages 1–16. The stages 1–16 are formed by alternating right-angle turns 68, and straight legs or sections 70. Additionally, the straight sections 70 of the passageway 58 alternate between extending in a circumferential direction and extending in a radial direction. The illustrated disc 56 has sixteen stages 1–16, that is, sixteen right-angle turns and sixteen straight sections. It is noted that the passageway 58 can have a greater or lesser number of stages 1–16 depending on, among other things, the desired outlet velocity. Preferably, the number of stages or turns is in the range of about 2 to about 60.

Each flow passageway 58 has multiple inlets 72 in order to screen out any debris in the flow stream. In the event that debris becomes lodged in one of the inlets 72, fluid is able to move around the obstruction and continue to feed each the passageways 58 without loss of capacity of the stacked discs 26. Although the flow passageways 58 are tortuous in shape, at no time do they become smaller in cross-sectional area than the inlets 72 so that any debris that does enter through the inlets 72, will pass entirely through the flow passageways 58.

The inlets 72 extend in a radial direction and open into a first straight section 1 which is circumferentially-extending so that the fluid makes a first turn immediately upon passing through the inlets 72. A second turn connects the end of the first section 1 with a second straight section 2 which is radially-extending and directs fluid flow in a radially outward direction. A third turn connects the end of the second section 2 with a third straight section 3 which is circumferentially-extending. The third section 3 is shorter than the first section 1 and directs fluid flow in the opposite direction (counter-clockwise in the illustrated passageway). A fourth turn connects the end of the third section 3 with a fourth straight section 4 which is radially-extending. The fourth section 4 is shorter than the second straight section 2 and directs fluid flow in the opposite or radially inward direction. A fifth turn connects the end of the fourth section 4 with a fifth straight section 5 which is circumferentially-extending. The fifth section 5 has a length generally equal to the third section 3 and directs fluid flow in the same direction (counter-clockwise in the illustrated passageway). A sixth turn connects the end of the fifth section 5 with a sixth straight section 6 which is radially-extending. The sixth section 6 is longer than the fourth section 4 and directs fluid flow in the opposite or radially outward direction.

A seventh turn connects the end of the sixth section 6 with a seventh straight section 7 which is circumferentially-extending. The seventh section 7 has a length generally equal to the combined length of the third and fifth sections 3, 5 and directs fluid flow in the opposite direction (clockwise in the illustrated passageway).

An eighth turn connects the end of the seventh section 7 with an eighth straight section 8 which is radially extending and directs fluid flow in a radially outward direction. A ninth turn connects the end of the eighth section 8 with a ninth straight section 9 which is circumferentially-extending. The ninth section 9 is shorter than the seventh section and directs fluid flow in the opposite direction (counter-clockwise in the illustrated passageway). A tenth turn connects the end of the ninth section 9 with a tenth straight section 10 which is radially-extending. The tenth section 10 is shorter than the eighth section 8 and directs fluid flow in the opposite or radially inward direction. An eleventh turn connects the end of the tenth section 10 with an eleventh straight section 11 which is circumferentially-extending. The eleventh section 11 has a length generally equal to the ninth section 9 and directs fluid flow in the same direction (counter-clockwise in the illustrated passageway). A twelfth turn connects the end of the eleventh section 11 with a twelfth straight section 12 which is radially-extending. The twelfth section 12 is longer than the tenth section 10 and directs fluid flow in the opposite or radially outward direction.

A thirteenth turn connects the end of the twelfth section 12 with a thirteenth straight section 13 which is circumferentially-extending. The thirteenth section 13 has a length generally equal to the combined length of the ninth and eleventh 9, 11 and directs fluid flow in the opposite direction (clockwise in the illustrated passageway). A fourteenth turn connects the end of the thirteenth section 13 with an fourteenth straight section 14 which is radially extending and directs fluid flow in a radially outward direction. A fifteenth turn connects the end of the fourteenth section 14 with a fifteenth straight section 15 which is circumferentially-extending. The fifteenth section 15 has a length generally equal to the length of the thirteenth section 13 and directs fluid flow in the opposite direction (counter-clockwise in the illustrated passageway).

Multiple sixteenth straight sections 16, three in the illustrated embodiment, extend in a radial direction from the fifteenth section 15 after a sixteenth turn. The sixteenth sections form multiple outlets 74. The multiple outlets 74 obtain a relatively low noise level because subdividing a fluid flow path into smaller streams, while taking a pressure drop, results in a lower noise level.

The second through sixth sections 2–6 form a first generally S-shaped portion 76 of the passageway 58 and the eighth through twelfth sections 8–12 form a second generally S-shaped portion 78 of the passageway 58. The first and second S-shaped portions 76, 78 are directly connected by the generally long and straight seventh section 7 so that the first and second S-shaped portions 76, 78 are oriented in the same direction.

Fluid is expanded at a predetermined expansion ratio as it progresses through the passageway 58 from the inlets 72 to the outlets 74. Expansion is obtained by increasing the cross-sectional area of the flow passageway 58. Preferably, the flow passageway 58 has a constant depth throughout its entire length. The width of the passageway 58, however, is progressively widened from the inlets 72 to the outlets 74. Preferably, each of the straight sections 1–16 has a constant cross-sectional area along their length which is larger than the upstream sections and smaller than the downstream sections. For example, each section can be about 7% larger than the immediately preceding section. The constant cross-sectional area along the length of each one of the sections 1–16 imposes energy losses and velocity control on the fluid from frictional losses occurring at the walls of the straight sections 1–16. The straight sections 1–16 of the passageway are sized long enough to provide true frictional losses rather than just losses due to a series of obstructions. The increases in the cross-sectional area are at the right-angle turns and impose not only additional frictional losses on the fluid but also an expansion of the fluid which results in a pressure drop.

It has been found that the most effective way to reduce energy in fluid is to have the fluid do work on itself. This is accomplished in the present invention by directing the fluid back toward the inlets 72, that is radially inwardly. In the illustrated embodiment the fluid is directed radially inwardly twice, once in each of the S-shaped portions 76, 78 of the passageway 58. In each of the S-shaped portions 76, 78, the fluid flows radially outwardly (sections 2 and 8), then quickly radially inwardly (sections 4 and 10), and then quickly radially outwardly (sections 6 and 12). The radially inward flow direction causes the fluid to act upon itself, expending energy by turbulent interaction.

The outwardly directing sections 6, 12, which immediately follow the turbulence generating inwardly directing sections 4, 10, are relatively long and straight to once again gain control of the fluid velocity. Preferably, the outwardly directing sections 6, 12 are at least about twice as long as the inwardly directing sections 4, 10. Additionally, the circumferentially-extending sections 7, 13, which immediately follow the outwardly directing sections 6, 12, are also each relatively long to further gain control of the fluid velocity, in addition to the frictional losses discussed hereinabove.

An open area or passage 80 is provided between adjacent flow passageways 58 at the end of each of the outwardly directing sections 6, 12, following the inwardly directing sections 4, 10. Should any turbulent eddies continue to exist in the flow at the end of the outwardly directing sections 6, 12, the passages 80 allow fluid in the two passageways 58 to interact and further resolve the turbulence. The passages 80 also allow the pressure of the associated stage to equalize about the disc 56 (between passageways 58).

An open area or passage 82 is also provided between adjacent flow passageways 58 at the end of the outwardly directing sections 2, 8 prior to the inwardly directing sections 4, 10 and the final outwardly directing section 14. The passages 82 allow fluid in the two passageways 58 to interact and resolve any existing turbulence. Again, the passages 82 also allow the pressure of the associated stage to equalize about the disc 56 (between passageways 58).

It can be seen from the above description that the end of each of the outwardly directing sections 2, 6, 8, 12, 14 preferably has a passage 80, 82 connecting it to the adjacent flow passageway 58. It should also be noted that the interaction, between the adjacent flow passageways 58, permits fluid to flow around any debris that may find its way into and plug one of the flow passageways 58 so that capacity and function of the disc 56 are not lost.

It has been found that the discs 58 of the present invention have much more linear and predictable pressure drops than prior art discs. This is believed to be due to the relatively large turbulence created by the inwardly directing sections 4, 10 and the frictional losses created by the relatively long straight sections 2, 6, 7, 8, 12, 13, 14, 15. In prior art discs, some turbulence is generated at obstructions but the fluid tends to merely take the path of least resistance with little or no wall contact and thus little or no frictional losses.

When the valve 20 is open, that is when the valve plug 30 is located above the stacked discs 26, high pressure fluid flows from the inlet chamber 32 to the outlet chamber 34 through the flow passageways 58 in the stacked discs 26. The plug 30 is typically moved (via steam actuator or the like) to expose a greater or lesser number of the discs 56, and the disc inlets 72, thereby controlling the amount of fluid flow that passes through the valve 20. Fluid enters the multi-turn passageways 58 at a high pressure through the inlets 72, flows through a prescribed number of pressure drop stages, and exits the passageways 58 through the outlets 74 at a desired outlet velocity.

Although particular embodiments of the invention have been described in detail, it will be understood that the invention is not limited correspondingly in scope, but includes all changes and modifications coming within the spirit and terms of the claims appended hereto.

What is claimed is:

1. A disc stack for a high energy loss fluid control device, said disc stack comprising a plurality of annularly-shaped discs stacked one upon another, each of said annularly-shaped discs having an inner periphery, an outer periphery, and a plurality of passageways extending between an inlet and an outlet located at said inner and outer peripheries, each of said passageways having a plurality of sections connected with right-angle turns with said sections alternating between extending in a circumferential direction and extending in a radial direction, wherein a first one of said sections is radially extending toward said inlet to cause fluid to act upon itself and expend energy by turbulent interaction, and a second one of said sections which is the next radially extending section downstream of said first one of said sections is generally straight and has a length which is greater than a length of said first one of said sections to gain control of fluid velocity for frictional losses.

2. The disc stack according to claim 1, wherein said second one of said sections is radially extending toward said outlet.

3. The disc stack according to claim 1, wherein a third one of said sections is circumferentially extending between said first and second ones of said sections, and has a length which is less than the length of said second one of said sections.

4. The disc stack according to claim 1, wherein the length of said second one of said sections is at least about twice the length of said first one of said sections.

5. The disc stack according to claim 1, wherein each of said discs have passages connecting adjacent ones of said passageways allowing fluid in adjacent passageways to interact and stage pressures to equalize.

6. The disc stack according to claim 5, wherein said passages connect a downstream end of said second one of said sections.

7. The disc stack according to claim 1, wherein each of said sections has a constant cross-sectional area along the length of said sections.

8. The disc stack according to claim 7, wherein each of said passageways has an expanding cross sectional area.

9. The disc stack according to claim 1, wherein said inlet includes a plurality of openings.

10. The disc stack according to claim 1, wherein said outlet includes a plurality of openings.

11. A disc stack for a high energy loss fluid control device, said disc stack comprising a plurality of annularly-shaped discs stacked one upon another, each of said annularly-shaped discs having an inner periphery, an outer periphery, and a plurality of passageways extending between an inlet and an outlet located at said inner and outer peripheries, each of said passageways having a plurality of sections connected with right-angle turns, said sections alternating between extending in a circumferential direction and extending in a radial direction, each of said passageways having first and second S-shaped portions which each consist of a first one of said sections which is generally straight and radially extending toward said outlet, a second one of said sections downstream of said first one of said sections which is generally straight and radially extending toward said inlet to cause fluid to act upon itself and expend energy by turbulent interaction, a third one of said sections circumferentially extending between an end of said first one of said sections and a first end of said second one of said sections, a fourth one of said sections downstream of said second one of said sections which is generally straight and radially extending toward said outlet, and a fifth one of said sections circumferentially extending between a second end of said second one of said sections and an end of said fourth one of said sections, wherein said first and second S-shaped portions are directly connected by a sixth one of said sections circumferentially extending between said fourth one of said sections in said first S-shaped portion and said first one of said sections in said second S-shaped portion.

12. The disc stack according to claim 11, wherein said fourth one of said sections is generally straight and has a length adequate to gain control of fluid velocity for frictional losses.

13. The disc stack according to claim 11, wherein said first one of said sections has a length greater than a length of said second one of said sections.

14. The disc stack according to claim 11, wherein said fourth one of said sections has a length greater than a length of said second one of said sections.

15. The disc stack according to claim 12, wherein said fourth one of said sections has a length at least about twice a length of said second one of said sections.

16. The disc stack according to claim 11, wherein each of said discs have passages connecting adjacent ones of said passageways allowing fluid in adjacent passageways to interact and stage pressures to equalize.

17. The disc stack according to claim 11, wherein said passages connect a downstream end of said S-shaped portions.

18. The disc stack according to claim 11, wherein each of said sections has a constant cross-sectional area.

19. The disc stack according to claim 18, wherein each of said passageways has an expanding cross-sectional area.

20. A high energy loss fluid control device comprising:
a plurality of annularly-shaped discs stacked one upon another, each of said annularly-shaped discs having an inner periphery, an outer periphery, and a plurality of passageways extending between an inlet and an outlet located at said inner and outer peripheries, each of said passageways having a plurality of sections connected with right-angle turns with said sections alternating between extending in a circumferential direction and extending in a radial direction, wherein a first one of said sections is radially extending toward said inlet to cause fluid to act upon itself and expend energy by turbulent interaction, and a second one of said sections is the next radially extending section downstream of said first one of said sections and has a length which is greater than a length of said first one of said sections to gain control of fluid velocity for frictional losses; and
a reciprocal plug in slidable contact with said discs such that reciprocal action of said plug selectively opens and closes said passageways whereby potential energy is dissipated and velocity controlled.

\* \* \* \* \*

US006039076C1

(12) EX PARTE REEXAMINATION CERTIFICATE (5910th)
United States Patent
Hemme et al.

(10) Number: US 6,039,076 C1
(45) Certificate Issued: Oct. 2, 2007

(54) HIGH ENERGY LOSS FLUID CONTROL DEVICE

(75) Inventors: Kent R. Hemme, Erie, PA (US); Allan K. Shea, Erie, PA (US)

(73) Assignee: SPX Corporation, Muskegon, MI (US)

Reexamination Request:
No. 90/006,272, Apr. 26, 2002

Reexamination Certificate for:
Patent No.: 6,039,076
Issued: Mar. 21, 2000
Appl. No.: 09/109,122
Filed: Jun. 30, 1998

(51) Int. Cl.
*F16K 47/08* (2006.01)
*F16K 47/00* (2006.01)

(52) U.S. Cl. ................... 137/625.37; 137/625.3
(58) Field of Classification Search ............ 137/625.3, 137/625.38; 138/42; 251/127
See application file for complete search history.

(56) References Cited

U.S. PATENT DOCUMENTS

| | | | | |
|---|---|---|---|---|
| 3,514,074 A | | 5/1970 | Self | 251/127 |
| 3,954,124 A | * | 5/1976 | Self | 138/42 |
| 4,011,287 A | * | 3/1977 | Marley | 261/64.3 |
| 4,068,683 A | * | 1/1978 | Self | 137/625.3 |
| 4,105,048 A | * | 8/1978 | Self | 138/42 |
| 4,127,146 A | * | 11/1978 | Self | 137/625.3 |
| 4,267,045 A | | 5/1981 | Hoof | 210/322 |
| 4,279,274 A | * | 7/1981 | Seger | 138/42 |
| 4,335,744 A | | 6/1982 | Bey | 137/522 |
| RE32,197 E | * | 7/1986 | Self | 251/127 |
| 4,617,963 A | * | 10/1986 | Stares | 137/625.3 |
| 4,938,450 A | | 7/1990 | Tripp | 251/30.03 |
| 5,390,896 A | * | 2/1995 | Smirl | 251/127 |

OTHER PUBLICATIONS

Copes–Vulcan, Inc. product Specification Sheet for Raven Trim, PS No. 53, Revision No. 0, May 6, 1998 [retrieved on Feb. 24, 2003]. Retrieved from the Internet:<URL: http://www.dezurik.com/Literature_PDF/Raven_PS_53.pdf>.*
Ron Adams, "DRAG Valves Give Kuosheng a 24 Mwe Boost", *Nuclear Engineering*, Jan. 1995, vol. 40 No. 486, p. 24–25.
Ron Adams, "DRAG Valves Give Kuosheng a 24 Mwe Boost", *Nuclear Engineering*, Jun. 1997.
Control Component, Inc Sales Brochure *Solutions*, 1991, vol. 1 No. 1.
Control Component, Inc Sales Brochure *Solutions*, 1992, vol. 1 No. 1.
Control Component, Inc Sales Brochure *Solutions*, 1995, vol. 1 No. 1.
Control Component, Inc Sales Brochure *Turbine Bypass System*, Nov. 1993.
Control Component, Inc. Sales Brochure *Turbine Bypass System*, Nov. 1997.

(Continued)

*Primary Examiner*—Alan Diamond

(57) ABSTRACT

A high energy loss fluid control device includes a plurality of annularly-shaped discs stacked one upon another and a reciprocal plug in slidable contact with the discs. Each of the discs has an inner periphery, an outer periphery, and a plurality of flow passageways extending between an inlet and an outlet located at the inner and outer peripheries. Each of the flow passageways have a plurality of sections connected with right-angle turns. The sections alternate between extending in a circumferential direction and a radial direction. Each passageway has an expanding cross-sectional area but each section has a constant cross-sectional area. A first one of the sections is radially extending toward the inlet to cause fluid to act upon itself and expend energy by turbulent interaction. Immediately downstream of the first section, second one of the sections is radially extending toward the outlet. The second section is generally straight and of a length adequate to regain control of fluid velocity for true frictional losses. Additionally, a passages connects adjacent passageways at the downstream end of the second passage so that fluid in adjacent passageways interacts, further resolves turbulence, equalizes stage pressure, and flows around any plugging by debris. Each passageway makes use of multiple inlets and outlets.

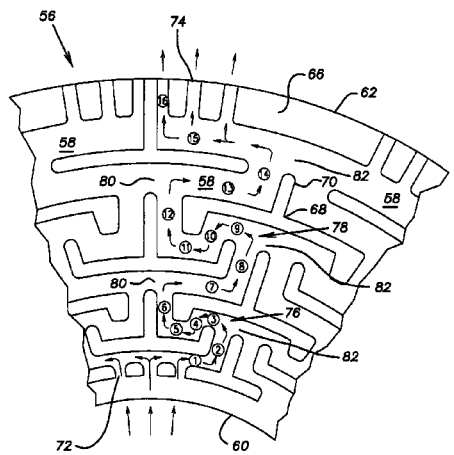

OTHER PUBLICATIONS

H. L. Miller, C G Sterud, "A High Pressure Pump Recirculation Valve", EPRI Power Plant Valves Symposium Presentation, Aug. 25–26, 1987.

Copes–Vulcan, Inc Sales Brochure *Vaven Control Valves*, 1997.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–23 are cancelled.

* * * * *